W. H. Akins.
Perm: Lock.
No. 1806.
Reissued. Nov. 8. 1864
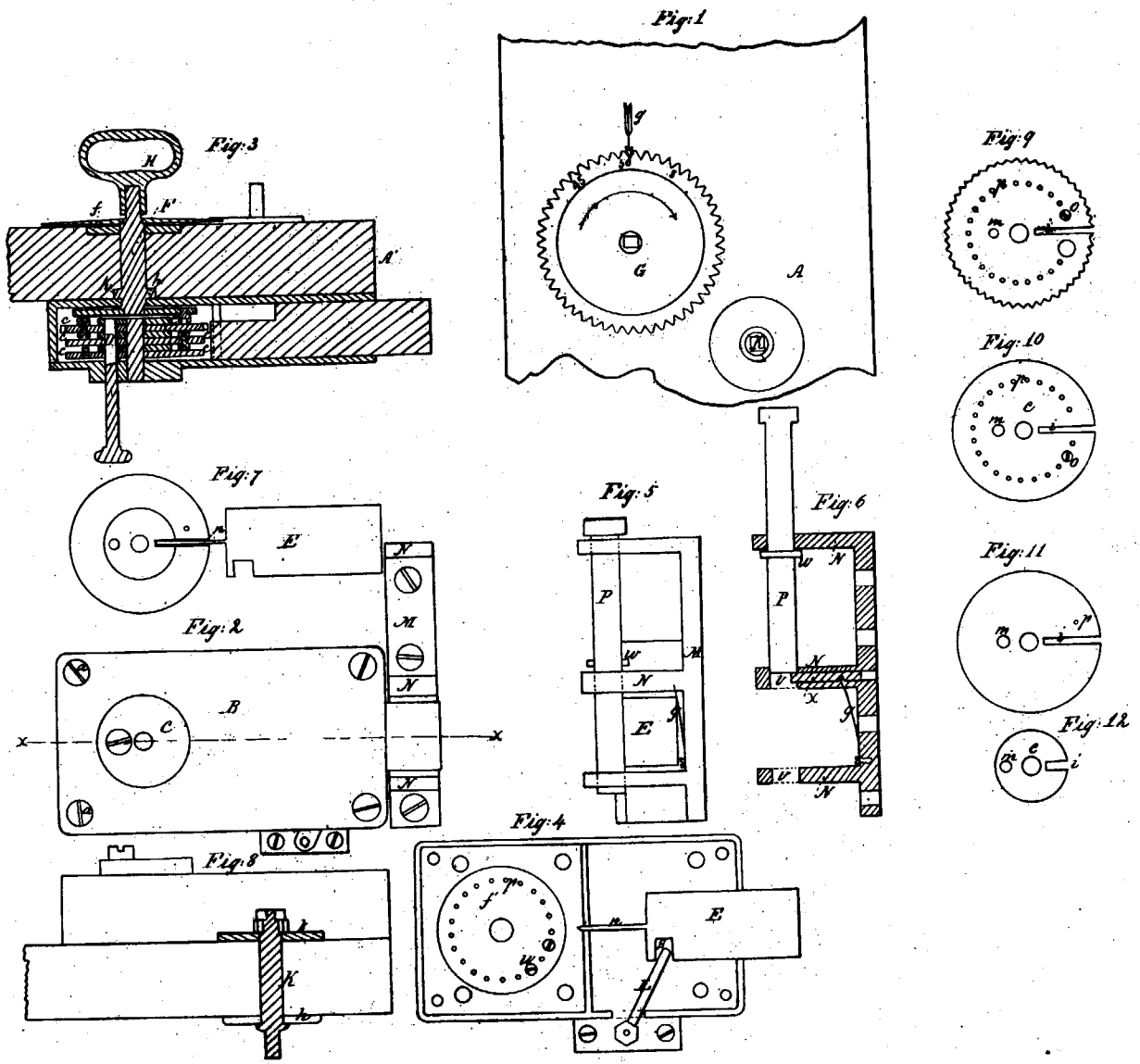
Inventor
Wm. H. Akins

UNITED STATES PATENT OFFICE.

WILLIAM H. AKINS, OF DRYDEN, NEW YORK.

IMPROVEMENT IN LOCKS.

Specification forming part of Letters Patent No. 14,848, dated May 13, 1856; Reissue No. 1,806, dated November 8, 1864.

*To all whom it may concern:*

Be it known that I, WILLIAM H. AKINS, of Dresden, in the county of Tompkins and State of New York, (but formerly of Berkshire, in the county of Tioga and State aforesaid,) did invent certain new and useful Improvements in Locks, (for which Letters Patent of the United States were granted me on the 13th day of May, 1856;) and I do hereby declare that the following is a full and correct description thereof, reference being had to the accompanying drawings, making part of this specification.

Figure 1 is a view of such parts of the lock as are on the outside of the door, the latter being shown in fragment. Fig. 2 is an elevation of the rear or inner side of the lock, showing its bolt as protruded and resting in the staple or catch of the door, the bolt of said staple being removed; Fig. 3, a longitudinal transverse section in the plane of line *x x*, Fig. 2; Fig. 4, a rear elevation of the lock with the back plate removed for showing the interior arrangement; Figs. 5 and 6, views of the staple or catch with which the bolt of the lock engages when protruded, the catch bolt or pin of said staple being shown lowered in the former figure, but raised in the last; Fig. 7, a diagram representing the lock-bolt and the revolving disks; Fig. 8, a plan of the under side of the lock and a horizontal section of the door in the plane of line *x x*, Fig. 2; Figs. 9, 10, 11, and 12, views of the revolving disks.

Like letters of reference indicate corresponding parts in all the figures.

I am well aware that permutation-locks have been heretofore used having a series of disks mounted upon collars, each fitting over the other, the inner one of which is mounted upon a stationary neck or stud, on which it is supported and worked; and I am also aware that upon the upper ends of these collars have been secured an index-finger to each, by which they could all be so arranged that each disk would be so placed that the lock-bolt might be withdrawn from the staple, so as to unlock the door; and I am likewise aware that the index-number of each disk could be changed separately without changing or altering those of the others by simply changing the position of the index-finger of any of the flanged collars by means of a set-screw and series of holes in the upper end of the collar; but such a change as this, while it did not alter the relative numbers of the other disks, caused the party making the change to institute a series of experiments, involving both time and labor, to determine what the index-number of the collar so changed then was. Such a lock as this is at once costly, cumbersome, and complicated, exceedingly liable to get out of order, and not at all adapted to common purposes.

My invention consists in so arranging and combining a series of revolving disks mounted upon a stationary neck or stud that all shall be severally set by each other in turn when properly operated upon by the end of a revolving shaft, so that the rear end of the lock-bolt shall be allowed to retract to permit the door to be unlocked, there being but one revolving graduated index necessary to adjust the whole, and that secured to the revolving shaft; and it further relates to a new method of instantly discovering the various numbers by which the several disks must be set in order to arrange them in the proper position for allowing the bolt to retract, and which consists in perforating each disk and fixed flange of the stud at the same angle to their slots, whereby, by passing a pin through a hole in the cap-piece of the lock, it shall enter the perforation of each in turn as they are respectively brought in position, the number indicated on the graduated plate by the arrow as the pin enters a disk being the number required to set it.

The advantages of such an arrangement will readily be perceived, as it enables the proprietor to change them, as occasion should require, without being compelled to enter into a long series of experiments to determine which are the proper ones to be used, thus saving both time and labor. As my lock, when applied to doors of houses, is not capable of being unlocked from the inside, because of its peculiar construction, I have invented a new staple or catch, whereby the door may be instantly opened without retracting the lock-bolt, and then by the simple act of closing the door locking it again, this feature constituting another branch of my invention.

My invention further relates to a method of misleading those who may be endeavoring to pick or unlock the door with burglarious intentions, and it consists in notching one of the revolving disks, (but I prefer the one next the end of the shaft, as it is the last disk to be set,) so that, as it is caused to revolve in order to arrange the others in position, it will prevent them from discovering the exact moment when they are properly placed, as its teeth while revolving will keep constantly striking against the inner end of the lock-bolt, in this way deceiving them with the delusion that the disks have been properly arranged, and finally cause them to relax their exertions and vigilance through their frequent mistakes.

My improved arrangement of the revolving disks may be applied to locks in many different ways and still remain essentially the same. For instance, the series may be used alone, mounted on a common axis, and provided with slots or indentations which, when arranged on a line, allow the bolt to retract; or they may be used without slots in connection with a second set of wheels provided with slots mounted on a separate axis, one set being employed to turn and arrange the other set. The former arrangement of a single set, however, is the simplest and most effective, and therefore such is shown in the accompanying drawings.

As represented, A is a door, to which is secured by means of screws *a a* a lock, B. At a suitable position the interior of this lock is provided with a stationary stud or bearing, D, upon which are mounted a series of revolving disks or wheels, *c c*. For the purpose of keeping the wheels apart, stationary flanges *e e*, secured to the stud, may be situated between them, as shown most clearly in Fig. 1. Where but a single set is employed, the disks and the flanges are provided with slots *i i*, which, when in the proper position, on a line, receive the tang *n* of the lock-bolt E when retracted, or, what is the equivalent in the arrangement of some locks, receive a corresponding part of the tumbler that releases and secures the lock-bolt. The disks are respectively provided with projections *o o* on their faces, which projections are coincident, and therefore when one disk is revolved its projection strikes that of the adjacent disk, and also gives it motion. The wheels are thus made to operate each other. In the drawings these projections are pins, which fit in a series of holes, *p p*, in such a manner that their relative position may be changed, so as to greatly increase the number of changes or permutations; but, if desired, the projection may be formed in any other manner, and be rigid in position; or, instead of having projections on the adjacent faces of two wheels, there may be a projection on only one, and a groove in the face of the other, with a suitable stop, corresponding in action with the projection. This would allow the disks to fit closer together. The disks receive the primary motion by means of a turning shaft, F, extending out through the lock and door, having a ring or knob, H, on its end for operating it, and provided on the inner end, next the disks, with a small crank, formed either by a fixed disk, *f*, having a projection, *u*, that engages with the first disk, or, what is the same, a small arm with the same projection. The fixed disk *f* may, if desired, also have the adjusting-holes *p*, into any of which the projection *u* may be changed to increase the number of combinations. A disk, G, having its face graduated, is connected with the shaft F at a suitable position, and is used in connection with an index, hand, *g*, to indicate the number at which the lock is set.

From the above description the method of arranging the disks *c c* so as to bring them in position to allow the lock-bolt to be retracted is obvious. The disks *c c* are arranged relatively with some particular number on the disk G. Then by turning forward and backward the requisite number of times, (according to the number of disks employed,) thereby bringing the projections *o o* of the disks in contact and turning the latter, and carefully bringing the number at which the combination is set on the disk G up to the index *g* each time, the disks will come in such position that all the slots *i i* will be on a line coincident with the tang of the lock-bolt or the tumbler. This method of operating the disks by the pins or projections is of the simplest character, requiring but little expense or labor, and is not liable to disarrangement. Its greatest advantage, however, is that a greater number than two disks can be employed, which is not the case, as I am aware, with any other device where the disks are mounted on a common axis. Two disks have before been used, in which the connection was a pin and slot and the motion a limited one; but the number of disks in such an arrangement could not be increased.

Through each of the disks *c c* and flanges *e e*, as also through the back plate of the lock, are pierced holes *m* at an equal distance from the axis of the shaft, at such a position that the hole in all the disks and the back plate will coincide when the disks are in position to allow the lock-bolt to retract. In these holes fits a pin, W, from the back of the lock. The object of this arrangement is to discover at what number the combination is set, if from forgetfulness or accident it should be lost, for by inserting the pin W in the hole at the back plate and pressing it gently in, and at the same time revolving the disks as fast as the latter come around in position, the pin will enter their holes and indicate the number.

Through a mortise in the door, immediately under the lock B, is passed the key-shaft K, and working in bearing *k* on the outside and inside of the door. To the inner end of this shaft is secured one end of a lever, L, the other extending up through a mortise in the side of the lock into a recess, *s*, formed on the under side of the lock-bolt E, which, according to the direction in which the shaft K is turned, will protrude or retract the bolt E to lock or unlock the door. M represents a plate secured to the side frame of the door by means of screws, from which project three arms, N, having a mortise, *v*, through their extremity, for the reception of the catch-bolt P, the whole forming the staple into which the bolt E is passed when the door is locked. By raising the catch-bolt P, as seen at Fig. 6, the door will be free to open without retracting the lock-bolt E, the former being held in its raised position by a small pin, *x*, pushed under it by means of a spring, *y*, secured to the face of the plate M, until the door is closed again, when the lock-bolt E will press the spring *y* back, withdrawing the pin *x* from under the catch P, which will then drop down through the mortise in each arm and lock the door, as seen at Fig. 5. To prevent the catch P from being withdrawn altogether from the arms N, a small pin, *w*, is passed through it between the two upper arms, N, to limit its range of motion.

What I claim as my invention is—

1. So arranging a series of revolving disks, *c c*, upon a fixed stud or bearing, D, that each in turn shall be made the means of adjusting the position of the next, the whole being operated by a turning shaft, F, substantially as herein specified.

2. In combination with a series of disks, *c c*, arranged and operating as above described, the stationary washers *e e*, for keeping the disks apart, substantially as herein set forth.

3. Altering the respective numbers of two or all the disks *c* by the simple change of an adjustable projection or pin from one hole to another, substantially as herein described.

4. The method herein described of discovering the proper numbers to open the lock, substantially as specified.

WILLIAM H. AKINS.

Witnesses:

M. VAN VALKENBURGH,
WILLIAM FITCH.